United States Patent [19]
Reinten

[11] Patent Number: 5,481,292
[45] Date of Patent: * Jan. 2, 1996

[54] EXPOSURE AND PRINTING DEVICE

[75] Inventor: Hans Reinten, Velden, Netherlands

[73] Assignee: Oce-Nederland B.V., Netherlands

[*] Notice: The portion of the term of this patent subsequent to Nov. 16, 2010, has been disclaimed.

[21] Appl. No.: 40,768

[22] Filed: Mar. 31, 1993

Related U.S. Application Data

[63] Continuation of Ser. No. 523,736, May 15, 1990, Pat. No. 5,262,798.

[30] Foreign Application Priority Data

May 17, 1989 [NL] Netherlands ............... 8901230

[51] Int. Cl.⁶ .................................................. B41J 2/45
[52] U.S. Cl. ......................................... 347/238; 347/233
[58] Field of Search .................... 346/107 R, 108, 346/160, 76 PH; 362/242, 249; 358/296, 300, 302; 359/739; 257/91; 347/238, 200, 130, 233

[56] References Cited

U.S. PATENT DOCUMENTS

| | | | |
|---|---|---|---|
| 4,259,679 | 3/1981 | Knibb et al. | 257/98 |
| 4,888,603 | 12/1989 | Hart et al. | 347/238 X |
| 5,262,798 | 11/1993 | Reinten | 346/107 R |

FOREIGN PATENT DOCUMENTS

| | | | |
|---|---|---|---|
| 0189664 | 8/1986 | European Pat. Off. | H04N 1/036 |
| 53-85435 | 7/1978 | Japan | B41M 5/26 |

*Primary Examiner*—Benjamin R. Fuller
*Assistant Examiner*—David Yockey
*Attorney, Agent, or Firm*—Reed Smith Shaw & McClay

[57] ABSTRACT

An exposure device in which a row of LED's is provided in the form of parallelograms having unequal sides, in which each of the corner points of one short side of a light-emitting surface is always in line, as considered in a direction perpendicular to the row, with one of the corner points of the other short side of an adjacent light-emitting element.

4 Claims, 4 Drawing Sheets

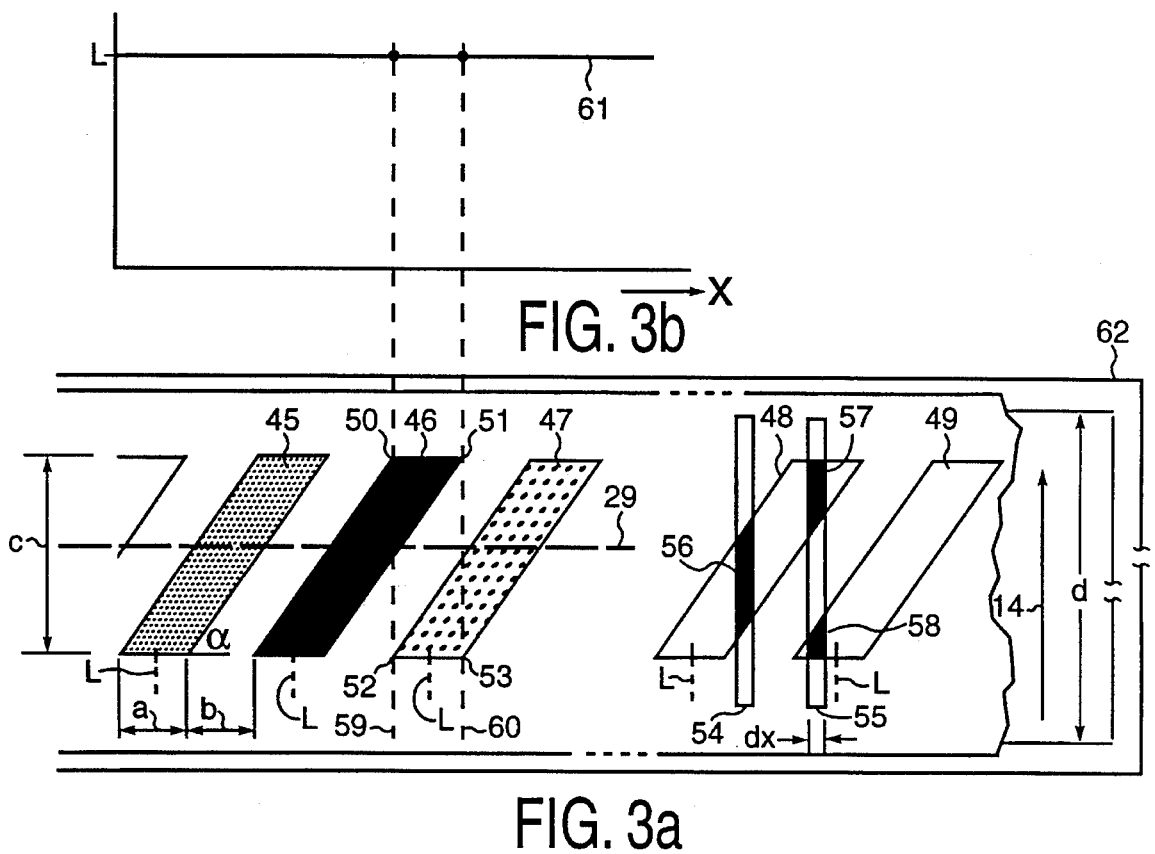
FIG. 3b
FIG. 3a
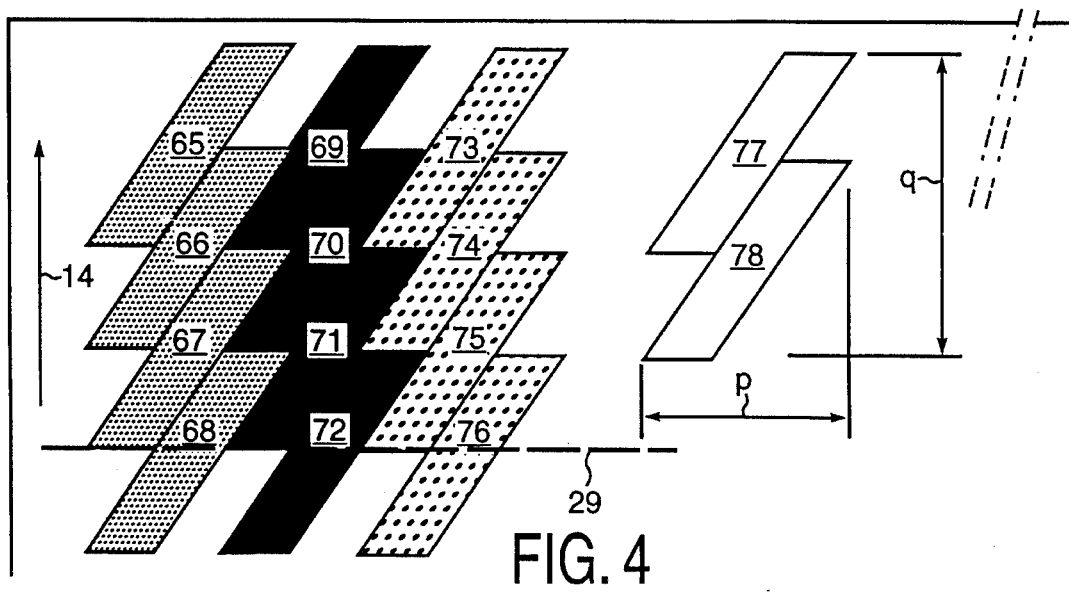
FIG. 4

EXPOSURE AND PRINTING DEVICE

This is a continuation of application Ser. No. 07/523,736 filed on May 15, 1990 now U.S. Pat. No. 5,262,798.

FIELD OF THE INVENTION

The present invention relates to a method and means for providing a uniform exposure for printing, and in particular to a printing means comprising a single row of light-emitting elements which are constructed in the form of parallelograms of unequal lengths with the shorter sides being perpendicular to the image-wise exposure and the corners of the short side being aligned with corners of the opposite short side of an adjacent light-emitting element.

BACKGROUND OF THE INVENTION

It is well known to use light-emitting elements, such as LED's, in printing devices, see U.S. Pat. No. 4,780,731 and European Patent Application A-0189664. Typically, two rows of LED's are used to achieve a uniform exposure, see NL-A 8300111. However, using two rows requires specialized synchronization between the data for the first and second rows.

The use of a single row of light-emitting elements has resulted in nonuniform exposures. See, for example, Japanese Application 60-99672, 63-309476 and 63-57262.

In U.S. Pat. No. 4,553,148, there is disclosed an exposure device comprising one straight row of light-emitting elements disposed with fixed spacing b between them in one plane. In this case the LED's are disposed in a straight row to image, by means of a Selfoc array, onto a moving photoconductor. In order to increase the light yield, the LED's are constructed in the form of elongate rectangles or parallelograms. By disposing a cylindrical lens between the row of LED's and the photoconductor, the elongate LED's are imaged as small squares or diamonds.

A disadvantage of these known devices is that the light distribution on the photosensitive medium as considered in the direction of the row is not equal, and between two image dots there is a zone where there is distinctly less light. To enable the photoconductor to be exposed at these places too, the total light level has to be increased e.g., by increasing the LED's energization current, and this increases the heat development and reduces the LED life.

Accordingly, it is an object of the present invention to provide a means for achieving a uniform exposure using a single row of light-emitting elements.

SUMMARY OF THE INVENTION

Generally, the present invention overcomes the disadvantages normally inherent in single row LED sources (LED's). According to the invention the disadvantages of the prior art are overcome by means of an exposure device, in which all arbitrary imaginary strips of equal width situated in the plane of the photoconductor and extending perpendicularly to the row always contain an equally large area that is exposed by the light-emitting elements or LED's. This is achieved by means of an energization device for energizing the light-emitting elements in such manner that each zone of the photoconductor receives exactly the same amount of light in the exposed areas.

More particularly, the present invention provides an exposure device which comprises a plurality of light-emitting elements aligned in a row in spaced apart relationship. The distance between elements is defined herein as "b." Each of the light-emitting elements is configured in the shape of a parallelogram having two long parallel sides positioned generally in the direction of exposure and two parallel short sides on the leading edge and trailing edge, respectively, of the image. The corners of the leading short edge of one element are disposed to align with corresponding corners of the trailing edge of an adjacent element.

Consequently, for a given printing speed it is possible to use a minimum energization current and non-exposed zones which would otherwise cause dark strips in the direction of transit of the photosensitive medium are effectively obviated in the print.

These and other advantages will be apparent from a perusal of the following description of presently preferred embodiments of the invention taken with reference to the drawings:

BRIEF DESCRIPTION OF THE DRAWINGS

FIG. 2b shows the light distribution associated with FIG. 2a.

FIG. 3a is a top plan view of an exposure device according to the invention.

FIG. 3b shows a light distribution associated with FIG. 3a.

FIG. 4 shows a number of image dots formed with an exposure device according to FIG. 3a.

PRESENTLY PREFERRED EMBODIMENTS

Figure 1:
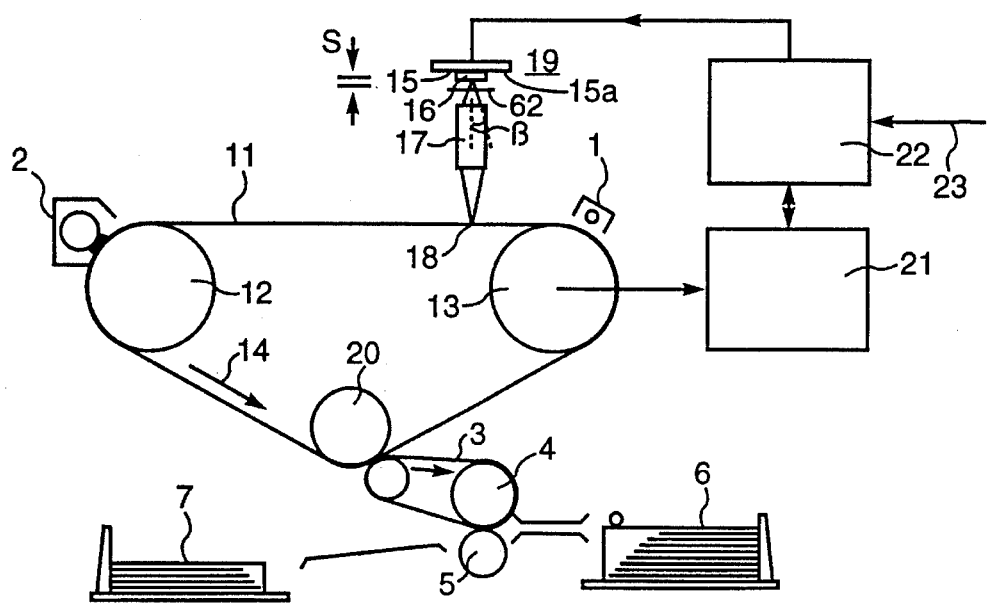
FIG. 1 is a diagram showing a printing device using a row of LED's.

FIG. 1 is a diagram showing a printing device in which an electrophotographic belt 11 is trained about three rollers 12, 13 and 20 in the direction of arrow 14 (auxiliary scanning direction). A belt of this kind provided, for example, with a zinc oxide layer or an organic photosensitive layer, is charged in known manner by means of a charging unit i and then exposed image-wise. Those places which have not received any light are developed with toner powder by means of developing device 2. The resulting powder image is transferred in known manner to a heated silicone rubber belt 3. A sheet of receiving material is fed from a sheet tray 6 between rollers 4 and 5, the powder image being transferred from the silicone rubber belt 3 to the receiving sheet and fused thereon. The resulting print is deposited in a substrate receiving tray 7. An exposure device 19 comprises a support 15 having a row of LED's 16 thereon extending perpendicularly to the direction of advance 14 of the belt 11 above the latter.

An array of imaging glass fibres 17, also known as a Selfoc array is disposed between the exposure device 19 and the belt 11 and images each LED on the electrophotographic belt 11 with an imaging ratio of 1:1 (position 18). An image signal is fed via line 23 to an energizing device 22. A pulse disc is disposed on the shaft of roller 13 and delivers a signal in proportion to the movement of belt 11. This signal is fed to a synchronization device 21 in which a synchronization signal is generated. In response to the synchronization signal the image signals are fed to exposure device 19 so that the electrophotographic belt 11 is exposed image-wise line by line to form a row of image dots on belt 11.

Figure 2B:
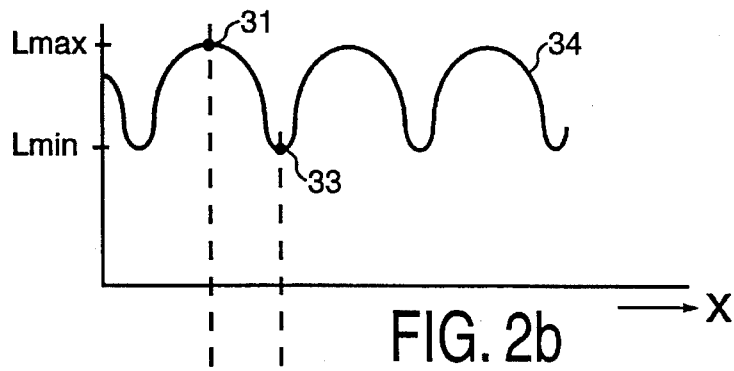
Figure 2A:
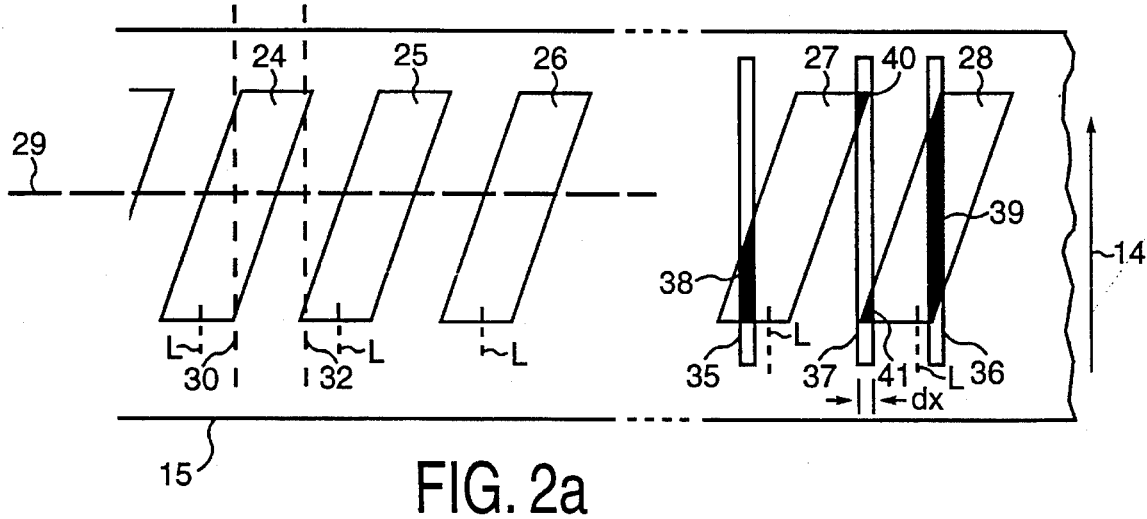
FIG. 2a is a top plan view of a row of LED's according to the prior art.

FIG. 2a is a diagrammatic top plan view of an LED array as known, for example, from U.S. Pat. No. 4,553,148. A number of parallelogram-shaped LED's 24–28 are disposed in a row in a spaced apart relationship on support 15. A photosensitive medium passes the row of LED's in the direction of arrow 14 (auxiliary scanning direction). The axis 29 along which the row of LED's extends indicates the main scanning direction.

The light distribution forming in a plane through the main scanning direction and perpendicular to the drawing plane is shown in FIG. 2b. In this graph the x-axis is drawn to the same scale as that of the row of LED's in FIG. 2a. Thus, point 31 of light distribution curve 34 in FIG. 2b indicates the amount of light received by a point on the photosensitive medium if that point is fed in the auxiliary scanning direction 14 over the broken line 30 along the row of LED's in FIG. 2a. The amount of light received by a point on the photosensitive medium fed along line 32 past the row of LED's is also denoted by point 33 in the light distribution curve 34.

In areas situated directly above the LED's the light distribution curve 34 has a maximum (Lmax) while in the areas between the LED's it has a minimum (Lmin).

Since a specific quantity of light is necessary to expose the photosensitive medium, Lmin will have to be at least such that this specific quantity is met. As a result, areas on the photosensitive medium fed, for example, over broken line 30 along the row of LED's will receive too much light.

FIG. 2a shows a number of imaginary strips 35, 36, and 37 of equal width dx and situated in the auxiliary scanning direction 14. A small surface on the photosensitive medium having width dx passing strip 35 receives light, if LED 27 is energized, only during the period when said surface is situated opposite zone 38. An equally wide surface on the photosensitive medium passing strip 36 receives a quantity of light during the period that LED 28 is energized and this surface is situated opposite zone 39.

It will be apparent from the drawing that this is a maximum quantity of light. A surface on the photosensitive medium passing the strip 37 receives a minimum quantity of light. This surface receives light only when it is situated opposite the zone 41 and then when it is situated opposite zone 40.

Accordingly, the amount of light that a surface on the photosensitive medium receives during the passage of said surface along the row of LED's is proportional to the area of the traversed light-emitting surface of the LED.

FIG. 3a is a diagram of an exposure device according to the invention. A row of parallelogram-shaped LED's 45–49 is disposed on a support. Each LED is so constructed that the corner points 50, 51 of one short side of an LED 46, as considered in the auxiliary scanning direction 14, are in line with the corner points 52, 53 of the other short side of a neighboring LED 47. Thus corner point 50 of LED 46 and corner point 52 of LED 47 are on the same straight line 59 as considered in the auxiliary scanning direction, and corner point 51 of LED 46 and corner point 53 of LED 47 are on the same straight line 60 as considered in the auxiliary scanning direction.

Here again, as in FIG. 2a, a number of imaginary strips 54, 55 are shown with equal width (dx) and extending in the auxiliary scanning direction 14. A surface on the photosensitive medium having a width dx passing the strip 54 in the auxiliary scanning direction 14 receives light during the period that LED 48 is energized and said surface is situated opposite the zone 56. A surface of equal width on the photosensitive medium passing the strip 55 receives light during the period that LED 49 is energized and said surface is situated opposite zone 58 and during the period that LED 48 is energized and said surface is situated opposite zone 57.

As a result of the specific geometry of the light-emitting surfaces (the LED's) the area of zone 56 is equal to the sum of the areas of the zones 57 and 58.

This relationship will apply to any arbitrary imaginary strip of width dx so that each arbitrary surface in the exposed part of the photosensitive medium will receive exactly the same amount of light. In FIG. 3b this equal light distribution is shown by curve 61. The quantity of light is equivalent to the minimum quantity Lmin in FIG. 2b.

The advantage of this equal light distribution is that the amount of light required becomes as small as possible, so that the energization current becomes a minimum and over-exposure of specific zones is avoided.

An additional advantage is that the influence of stray light is also small and the exposure latitude increased.

Exposure latitude in this context denotes the ratio between the minimum quantity of light falling on the photosensitive medium locations requiring to be exposed (Lmin), and the quantity of stray light (Lst) that the photosensitive medium receives in those zones which are not exposed image-wise.

In the exposure device according to the invention, this ratio is at a maximum as a result of a distribution which is as uniform as possible. Other steps to make this ratio as large as possible are based on further reducing the quantity of stray light. Thus in an array of LED's the surface or zone 15A (FIG. 1) surrounding the LED's which does not emit light may be provided with a non-reflecting layer. The LED connecting leads, which are partially depicted in FIGS. 2a, 3a and 5 and designated by reference character "L" frequently make a considerable contribution to stray light; hence, the may also be provided with a non-reflecting layer, or be disposed so far away from the light-emitting surface that the reflections meet the Selfoc array 17 disposed above the LED's at too large an angle of incidence, so that these reflections are not imaged on the photosensitive layer.

Another step to further reduce stray light is to dispose a diaphragm 62 (FIGS. 1 and 3a) preferably having a substantially rectangular slit between the row of LED's and the Selfoc array 17. With approximately 5 mm to 7 mm spacing between the LED's and the Selfoc array 17 a diaphragm 62 having a slit width d of about 150 mm at a distances (FIG. 1) of about 0.5 mm from the LED's is sufficient to reduce the stray light considerably. The slit width d is a compromise between, on the one hand, the need to admit as much direct light as possible through the Selfoc array 17 and, on the other hand, the need to keep back as much as possible that stray light which would meet the Selfoc array 17 at the correct angle of incidence. The distances between the diaphragm 62 and light-emitting elements, and the slit width d of the diaphragm, as considered in a direction perpendicular to the row, is so selected that rays of light which are emitted by the light-emitting elements (LED's) at an angle greater than the maximum angle of incidence 'b (FIG. 1) of the focussing glass fibres of array 17 (about 24°) are held back by the diaphragm 62. Given a light-emitting element length c considered in the direction perpendicular to the row, then the optimal relationship between the diaphragm slit width d and the distance S measured from the LED to the diaphragm 62, for a maximum angle of incidence 'b of the focussing glass fibres, is given by:

$$d = c + S \cdot \tan \text{'}b$$

In FIG. 3a, the distance b between two LED's 45,46 is equal to the width a of an LED. Under the conditions drawn, the angle 'a is equal to 45°. In the embodiment illustrated, a='30 'mm, b=30 'mm. For the dimension c of an LED as considered perpendicular to the main scanning direction, c=60 'mm. It will also be clear that any other dimension can be adapted to specific needs.

An image that has to be depicted on a photosensitive medium consists of a large number of image dots which must adjoin one another accurately in order not to leave any unexposed portions. FIG. 4 shows a number of image dots on the photosensitive medium obtained with an exposure device according to FIG. 3a. The main scanning direction 29 is shown in the drawing and the row of LED's (not shown) is situated directly above this. The photosensitive medium moves in the auxiliary scanning direction 14.

The instant zone 65 is directly opposite LED 45 (FIG. 3a) LED 45 is energized pulse-wise with a first image signal and thus exposes zone 65. Similarly zone 69 is exposed with LED 46 and zone 73 with LED 47. The instant that the photosensitive medium has been conveyed on over a distance of ½ c, or 30 'mm, LED 45 is again energized with the same first image signal and thus exposes the zone 66. This zone 66 exactly adjoins zone 65 as a result of the geometry chosen for the LED's.

Accordingly, LED's 46 and 47 expose the zones 70 and 74 with the first image signals for the LED's 46 and 47. After the photosensitive medium has again been conveyed over a distance ½ c=30 'mm a second image signal is fed to LED 45. This second image signal energizes LED 45 so that zone 67 is exposed. This zone again exactly adjoins zone 66. After another movement of ½ c=30 'mm LED 45 is again energized with the same second image signal and zone 68 is exposed. Similarly, zones 71 and 72 are exposed by means of LED 46 with the same image signal and zones 75 and 76 by means of LED 47.

An image line is a row of image dots situated adjacent one another as considered in the main scanning direction. An image dot is a zone on the photosensitive medium obtained by exposing such zone with one and the same image signal. This is shown in FIG. 4 by means of zones 77 and 78. The dimension of this image dot in the main scanning direction p and auxiliary scanning direction q is 90×90 'mm.

As will also be seen from FIG. 4, all the exposed zones adjoin one another exactly in the main scanning direction and in the auxiliary scanning direction so that there are no unexposed zones left.

Figure 5:
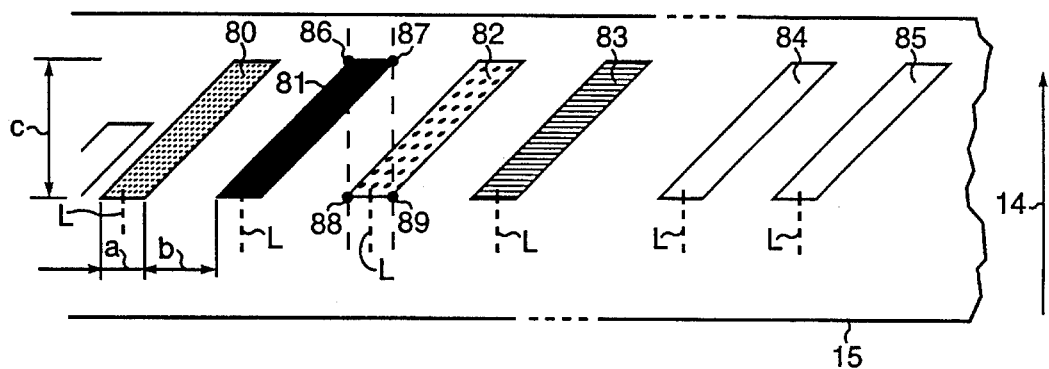
FIG. 5 is a top plan view of another exposure device according to the invention.

FIG. 5 shows another embodiment of the exposure device according to the invention. Here again the corner points 86, 87 of an LED 81 are in line with the corner points 88, 89 of a neighboring LED 82. However, the distance b between two LED's 80, 81 is exactly twice that of the dimension a of the LED's 80, 81. In the embodiment illustrated a=15 'mm, b=30 'mm and c=60 'mm.

Figure 6:
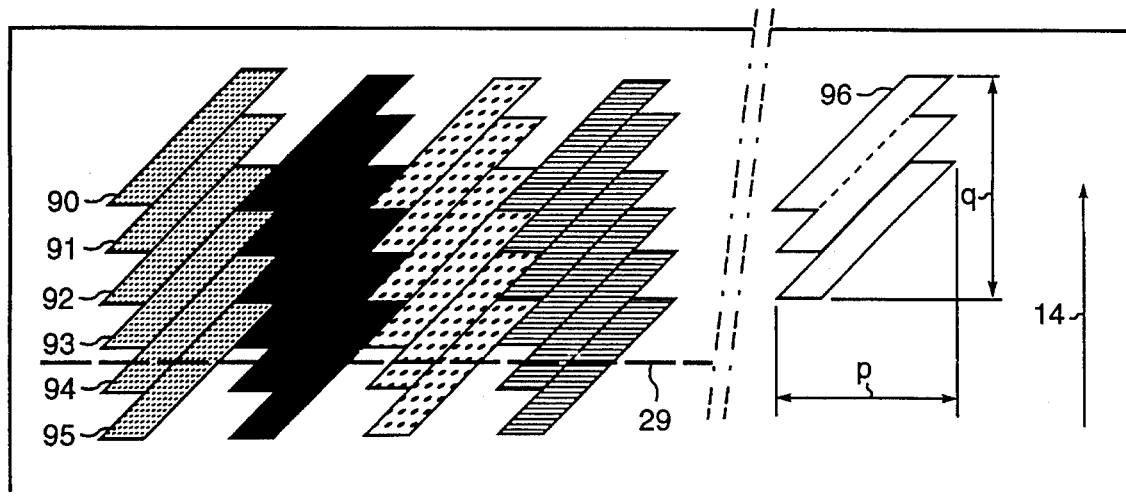
FIG. 6 shows a number of image dots on the photosensitive medium produced by means of an exposure device according to FIG. 5.

FIG. 6 illustrates a number of image dots on the photosensitive medium obtained with an exposure device according to FIG. 5.

By analogy with the printing device shown in FIG. 4, the auxiliary scanning direction is denoted by arrow 14 and the main scanning direction and the position of the row of LED's by line 29. The instant that zone 90 is directly opposite LED 80 (FIG. 5), LED 80 is energized pulse-wise with a first image signal. When the photosensitive medium has been conveyed on over a distance of ⅓ c=20 'mm LED 80 is again energized with the same first image signal and zone 91 is exposed. After the photosensitive medium has again advanced ⅓ c=20 'mm, LED 80 is energized for the third time with the same first image signal and zone 92 is exposed. Each time that the photosensitive medium has moved ⅓ c=20 'mm, LED 80 is then energized three times with the next image signal so that zones 93, 94 and 95 are exposed. In this way, a photosensitive medium is exposed to light accurately without any holes or overlaps.

The size of an image dot 96 is p×q or 60×100 'mm. Thus many other dimensions are possible to obtain accurate exposure of a photosensitive layer, according to the idea of the invention. Provided that the condition is satisfied to the effect that the corner points of two adjacent parallelograms are situated perpendicularly above one another, exposure can always be obtained so as to fill the image completely. After each movement of the photosensitive medium over distance k, where:

$$k = \frac{D \cdot c}{a+b}$$

an LED must be energized in order to obtain complete filling of the image. Here, a is the width of an LED measured in the main scanning direction, c is the dimension of an LED measured in the auxiliary scanning direction and b is the distance between two adjacent LED's, also measured in the main scanning direction. D is a distance (preferably the largest distance) of which both a and b are complete multiples. If, for example, a=b, then for the maximum value of D, D is equal to a or b. Alternatively, D may be made equal to ½ a or ⅓ a for example.

In an exposure device according to the invention the distance b between two LED's can be selected to be smaller than the width a of an LED. In order to obtain complete filling of the image in this situation, an LED must just as well be energized after each movement of the photosensitive medium over a distance k in accordance with the same formula. For a row of LED's having the dimensions a=45 'mm, b=15 'mm, c=60 'mm and D=15 'mm applies k=15 'mm. In these circumstances each zone on the photosensitive medium is exposed three times by an LED with pulse-wise energization of the LED's, while here again all the exposed zones receive exactly the same amount of light. Since these zones overlap to some extent, some unsharpness occurs in this way at the edges of an image to be depicted. In the above described example, therefore, an adjoining strip of 15 'mm will be exposed twice at the edge of an image and a strip situated between 15 'mm and 30 'mm from the edge of an image will be exposed once. After development, the result is an edge which terminates via two grey steps, so that in particular, oblique lines on the photosensitive medium have a more uniform less sharply graduated appearance.

In the examples described it has always been assumed that an image dot is formed by energizing a light-emitting element a number of times with the same image signal. It is equally possible, for example, with an exposure device according to FIG. 5, not to energize an LED 80 three times successively with the same image signal to form an image dot, but, for example, only twice so that only the zones 90 and 91 (FIG. 6) are exposed. Zone 92 remains unexposed. The result is an image dot of which two-thirds is white and one-third is black. This is a form of image dot size modulation with which a number of grey tints can be obtained.

The same technique is also applicable with light-emitting elements satisfying the relation a>b, in which each image dot is obtained by a number of overlapping exposures. Here again by applying for each image dot less exposures (energizations) than is necessary for a complete exposure, image dots are formed with a specific grey tint.

However, it is always a requirement, for complete exposure of image dots as considered in the main scanning direction, that such image dots should exactly adjoin one another so that a flat light distribution is obtained in the main scanning direction too, so that there are no unexposed zones left on the photosensitive medium.

Figure 7:
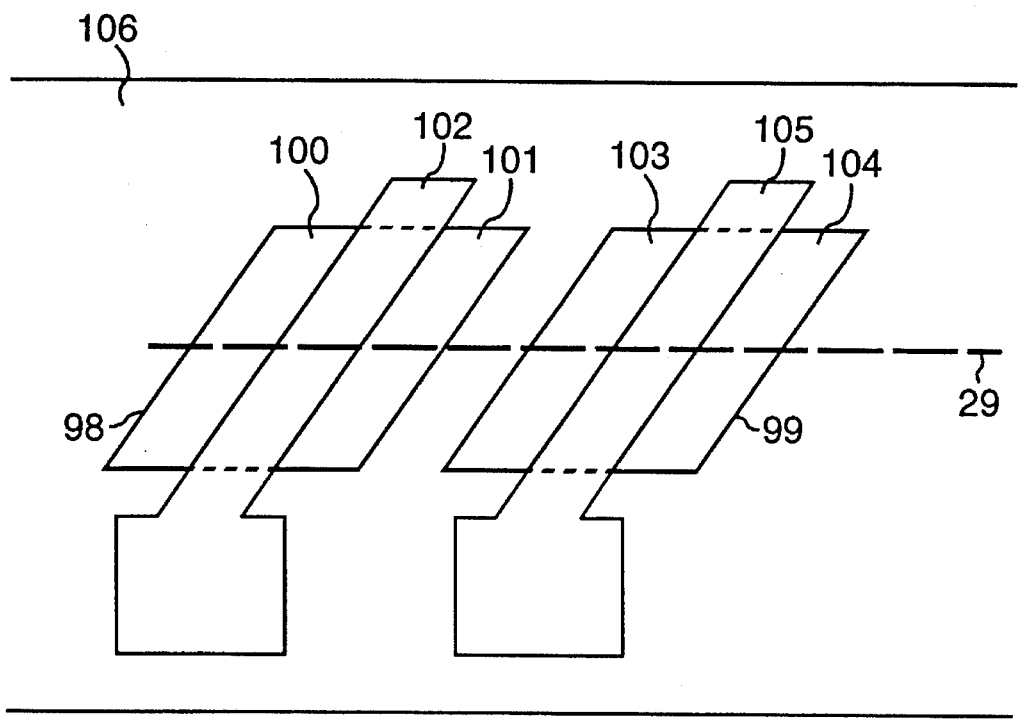
FIG. 7 is another embodiment of an exposure device according to the invention.

FIG. 7 shows a further embodiment of a row of LED's. Light-emitting zones 98, 99 are disposed on a substrate 106. Electrodes 102, 105 are then vapor-applied thereover to energize the light-emitting zones 98, 99. As a result each LED comprises two partial zones 100,101 and 103, 104, respectively which are energized simultaneously when an image signal is applied. For each of these partial zones the corner points of one short side of a partial zone as considered in the auxiliary scanning direction must again be in line with the corner points of the other short side of an adjacent partial zone. In the embodiment illustrated, the width of a partial zone is the electrode width, and the distance between two LED's is in each case 15 'mm, while the length c of the LED's measured in the auxiliary scanning direction is 30 'mm, so that applies k=15 'mm.

Figure 8:
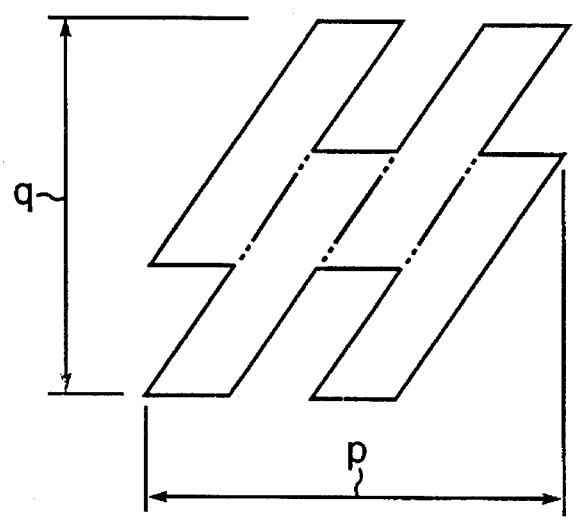
FIG. 8 shows an image dot obtained with an exposure device according to FIG. 7.

FIG. 8 shows an image dot formed with this array. The dimension in the auxiliary scanning direction is q=45 'mm and in the main scanning direction p=75 'mm.

The description of the images on photosensitive medium is based on ideal optics and the use of pulses of very short duration for control purposes. However, the inventive idea can be applied equally to a system in which the optics are not ideal and with any arbitrary pulse duration, an equal light distribution always being obtained.

The invention is not restricted to the embodiments described. The one skilled in the art will be able to apply several variations thereto, all of which will however come under the following claims.

What is claimed is:

1. An exposure device consisting of one straight row of light-emitting elements disposed with a fixed spacing between each of said elements, each of said light-emitting elements being in a form of a parallelogram having long and short sides joined at corner points, the corner points of one short side of one light-emitting element being in line, as considered in a direction perpendicular to the row, with the corner points of an opposite short side of an adjacent light-emitting element, wherein each of the short sides are defined by a length and wherein a ratio between the fixed spacing and the length of each of the short sides is a whole number.

2. An exposure device consisting of a plurality of light-emitting elements aligned in a row in spaced apart relationship wherein a fixed spacing defines the space between each of said elements, said row extending substantially perpendicular to a direction of image exposure, each of said elements being in a form of a parallelogram having two parallel long sides extending generally in the direction of image exposure and two parallel short sides joined at corners to said long sides, the corners of a leading edge short side of one element being aligned in the direction of exposure with corresponding corners of a trailing edge short side of an adjacent element, wherein each of the short sides are defined by a length and wherein a ratio between the fixed spacing and the length of each of the short sides is a whole number.

3. An exposure device consisting of one straight row of light-emitting elements disposed with a fixed spacing between each of said elements, each of said elements being in a form of a parallelogram having long and short sides joined at corner points, the corner points of one short side of one light-emitting element being in line, as considered in a direction perpendicular to the row, with the corner points of an opposite short side of an adjacent light-emitting element, wherein each of the short sides are defined by a length and wherein the fixed spacing is substantially equal to the length of each of the short sides.

4. An exposure device consisting of a plurality of light-emitting elements aligned in a row in spaced apart relationship wherein a fixed spacing defines the space between each of said elements, said row extending substantially perpendicular to a direction of image exposure, each of said elements being in a form of a parallelogram having two parallel long side extending generally in the direction of image exposure and two parallel short sides joined at corners to said long sides, the corners of a leading edge short side of one element being aligned in the direction of exposure with corresponding corners of a trailing edge short side of an adjacent element, wherein each of the short sides are defined by a length and wherein the fixed spacing is substantially equal to the length of each of the short sides.

* * * * *